US009087062B2

(12) United States Patent
Bennett et al.

(10) Patent No.: US 9,087,062 B2
(45) Date of Patent: Jul. 21, 2015

(54) TIERED-ARCHIVE MAINTENANCE

(71) Applicant: BANK OF AMERICA CORPORATION, Charlotte, NC (US)

(72) Inventors: Deborah N. Bennett, Conyers, GA (US); Deborah A. Copes, Wethersfield, CT (US); Timmy L. Gauvin, Peachtree City, GA (US)

(73) Assignee: Bank of America Corporation, Charlotte, NC (US)

( * ) Notice: Subject to any disclaimer, the term of this patent is extended or adjusted under 35 U.S.C. 154(b) by 224 days.

(21) Appl. No.: 13/907,096

(22) Filed: May 31, 2013

(65) Prior Publication Data

US 2014/0358863 A1    Dec. 4, 2014

(51) Int. Cl.
G06F 17/30    (2006.01)
(52) U.S. Cl.
CPC ................. *G06F 17/30073* (2013.01)
(58) Field of Classification Search
USPC ............... 707/3, 661; 711/170; 709/204–206
See application file for complete search history.

(56) References Cited

U.S. PATENT DOCUMENTS

| 6,615,335 | B1* | 9/2003 | Kleihorst et al. | 711/170 |
| 7,720,818 | B1* | 5/2010 | Laura | 707/661 |
| 2006/0259468 | A1* | 11/2006 | Brooks et al. | 707/3 |

* cited by examiner

*Primary Examiner* — Etienne Leroux
(74) *Attorney, Agent, or Firm* — Michael A. Springs; Moore & Van Allen PLLC; Nicholas C. Russell

(57) ABSTRACT

Embodiments of the present invention relate to systems, computer-implemented methods, and computer program products for managing a tiered archive. In some embodiments, a method is provided that includes: (a) providing an archive having two or more tiers for storing data, where each of the two or more tiers is assigned an image quality value, and wherein the image quality value assigned to each of the two or more tiers of the archive is different; (b) managing the archive based on a schedule for managing the data or on one or more rules, wherein managing the archive comprises: (1) storing data in a first of the two or more tiers based on the image quality value assigned to the first tier; and (2) storing data in a second of the two or more tiers based on the schedule and the image quality value assigned to the second tier.

17 Claims, 3 Drawing Sheets

TIERED-ARCHIVE MAINTENANCE

BACKGROUND

Today, many financial institutions are required by federal and some state regulations to maintain image file records of all deposited checks and other negotiable instruments. In many instances, financial institutions are required to maintain this information for up to seven years. Currently, in the domestic market, tens of billions of dollars in checks are processed every year. The result of such a high volume of check processing by banks and other financial institutions is that very large amounts of storage space is required for properly maintaining image file records as required by law. Thus, there is a need to provide systems, methods, and computer program products that enable financial institutions to reduce the amount of storage space required for maintaining image file records of deposited checks and other negotiable instruments.

BRIEF SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Some embodiments of the present invention provide a system for managing an archive having multiple layers configured for storing data that includes: an archive having two or more tiers for storing data, where each of the two or more tiers is assigned an image quality value, and wherein the image quality value assigned to each of the two or more tiers of the archive is different, and wherein each of the two or more tiers have data stored therein; a processing device in communication with the archive, wherein the processing device is configured to: manage the archive based at least partially on a schedule for managing the data stored in each of the two or more tiers or on one or more rules, wherein managing the archive comprises: (1) storing data in a first of the two or more tiers of the archive based at least partially on the image quality value assigned to the first of the two or more tiers of the archive; and (2) storing data in a second of the two or more tiers of the archive based at least partially on the schedule and the image quality value assigned to the second of the two or more tiers of the archive.

In some embodiments of the system, each of the two or more tiers is assigned a file format for storing data, and wherein the file format assigned to each of the two or more tiers of the archive is different; wherein the storing data in the first of the two or more tiers of the archive is further based at least partially on the file format assigned to the first of the two or more tiers of the archive; and wherein the storing data in the second of the two or more tiers of the archive is further based at least partially on the file format assigned to the second of the two or more tiers of the archive.

In some embodiments of the system, each of the two or more tiers is assigned a data storage space for storing data, and wherein the data storage space assigned to each of the two or more tiers of the archive is different.

In some embodiments of the system, the processing device is further configured to periodically transfer data having the image quality of the first tier of the archive and stored in the first to the second tier of the archive based on the schedule or the one or more rules, wherein the data is then stored in the second tier of the archive based at least partially on the image quality assigned to the second tier of the archive.

In some embodiments of the system, the one or more rules relate to instructions for managing the archive by, at least, transferring data stored in the archive between the two or more tiers in the archive.

In some embodiments of the system, the schedule for managing the data stored in the two or more tiers based at least partially on legal requirements for storing financial data at a financial institution.

In some embodiments of the system, wherein the image quality value assigned to each of the two or more tiers in the archive is based on a range of dots per inch (dpi) values or pixel values.

In some embodiments a computer-implemented method for managing an archive having multiple layers configured for storing data is provided that includes: (a) providing an archive having two or more tiers for storing data, where each of the two or more tiers is assigned an image quality value, and wherein the image quality value assigned to each of the two or more tiers of the archive is different, and wherein each of the two or more tiers have data stored therein; (b) providing a computer processor executing non-transitory computer-readable instruction code specifically structured to cause the computer processor to: (1) storing data in a first of the two or more tiers of the archive based at least partially on the image quality value assigned to the first of the two or more tiers of the archive; and (2) storing data in a second of the two or more tiers of the archive based at least partially on the schedule and the image quality value assigned to the second of the two or more tiers of the archive.

In some embodiments of the method, each of the two or more tiers is assigned a file format for storing data, and wherein the file format assigned to each of the two or more tiers of the archive is different; wherein the storing data in the first of the two or more tiers of the archive is further based at least partially on the file format assigned to the first of the two or more tiers of the archive; and wherein the storing data in the second of the two or more tiers of the archive is further based at least partially on the file format assigned to the second of the two or more tiers of the archive.

In some embodiments of the method, each of the two or more tiers is assigned a data storage space for storing data, and wherein the data storage space assigned to each of the two or more tiers of the archive is different.

In some embodiments of the method, the computer processor is further executing computer-readable instruction code specifically configured to cause the computer processor to periodically transfer data having the image quality of the first tier of the archive and stored in the first to the second tier of the archive based on the schedule or the one or more rules, wherein the data is then stored in the second tier of the archive based at least partially on the image quality assigned to the second tier of the archive.

In some embodiments of the method, the one or more rules relate to instructions for managing the archive by, at least, transferring data stored in the archive between the two or more tiers in the archive.

In some embodiments of the method, the schedule for managing the data stored in the two or more tiers based at least partially on legal requirements for storing financial data at a financial institution.

In some embodiments of the method, wherein the image quality value assigned to each of the two or more tiers in the archive is based on a range of dots per inch (dpi) values or pixel values.

In some embodiments of the present invention a computer program product for managing an archive having multiple layers configured for storing data is provided that includes a non-transitory computer-readable medium, wherein the non-transitory computer-readable medium comprises one or more computer-executable program code portions that, when executed by a computer, cause the computer to: manage an archive having two or more tiers for storing data, where each of the two or more tiers is assigned an image quality value, and wherein the image quality value assigned to each of the two or more tiers of the archive is different, and wherein each of the two or more tiers have data stored therein, wherein managing the archive is based at least partially on a schedule for managing the data stored in each of the two or more tiers or on one or more rules, wherein managing the archive comprises: (a) storing data in a first of the two or more tiers of the archive based at least partially on the image quality value assigned to the first of the two or more tiers of the archive; and (b) storing data in a second of the two or more tiers of the archive based at least partially on the schedule and the image quality value assigned to the second of the two or more tiers of the archive.

In some embodiments of the computer program product, each of the two or more tiers is assigned a file format for storing data, and wherein the file format assigned to each of the two or more tiers of the archive is different; wherein the storing data in the first of the two or more tiers of the archive is further based at least partially on the file format assigned to the first of the two or more tiers of the archive; and wherein the storing data in the second of the two or more tiers of the archive is further based at least partially on the file format assigned to the second of the two or more tiers of the archive.

In some embodiments of the computer program product, each of the two or more tiers is assigned a data storage space for storing data, and wherein the data storage space assigned to each of the two or more tiers of the archive is different.

In some embodiments of the computer program product, the one or more computer-executable program code portions, when executed by the computer, cause the computer to periodically transfer data having the image quality of the first tier of the archive and stored in the first to the second tier of the archive based on the schedule or the one or more rules, wherein the data is then stored in the second tier of the archive based at least partially on the image quality assigned to the second tier of the archive.

In some embodiments of the computer program product, the one or more rules relate to instructions for managing the archive by, at least, transferring data stored in the archive between the two or more tiers in the archive.

In some embodiments of the computer program product, the schedule for managing the data stored in the two or more tiers based at least partially on legal requirements for storing financial data at a financial institution.

BRIEF DESCRIPTION OF THE DRAWINGS

Figure 1:
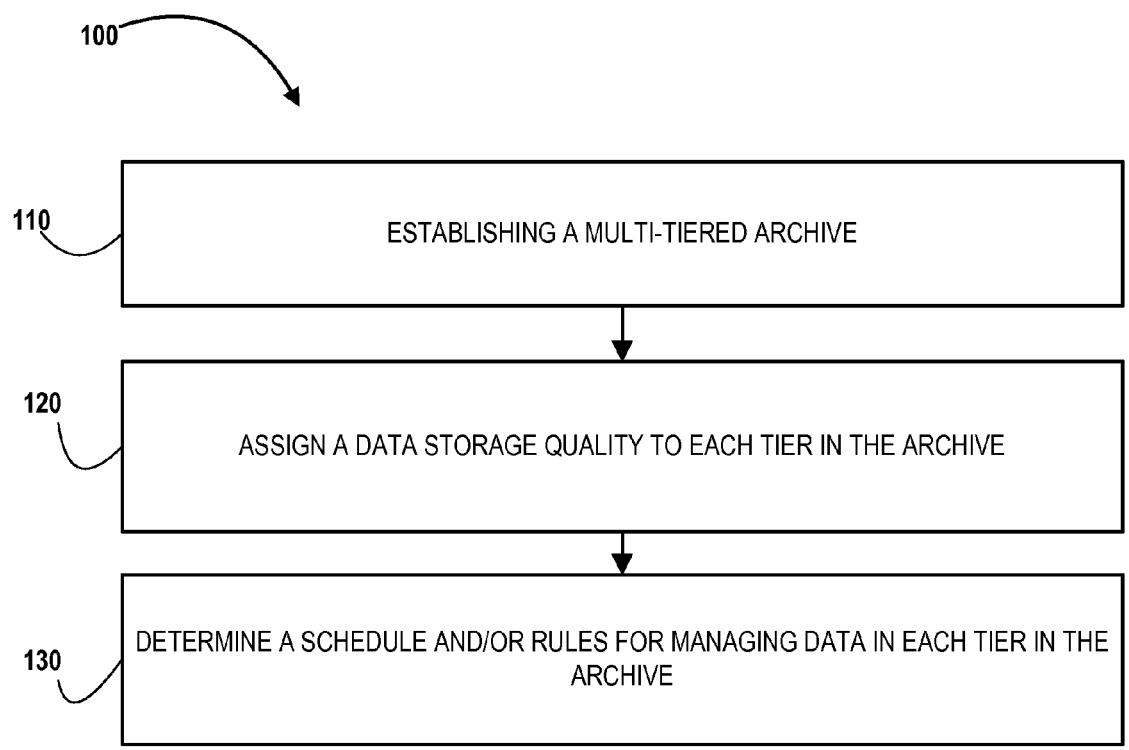

Having thus described embodiments of the invention in general terms, reference will now be made to the accompanying drawings, which are not necessarily drawn to scale, and wherein:

FIG. 1 illustrates a general process flow 100 for establishing a tiered archive, in accordance with some embodiments of the invention.

Figure 2:
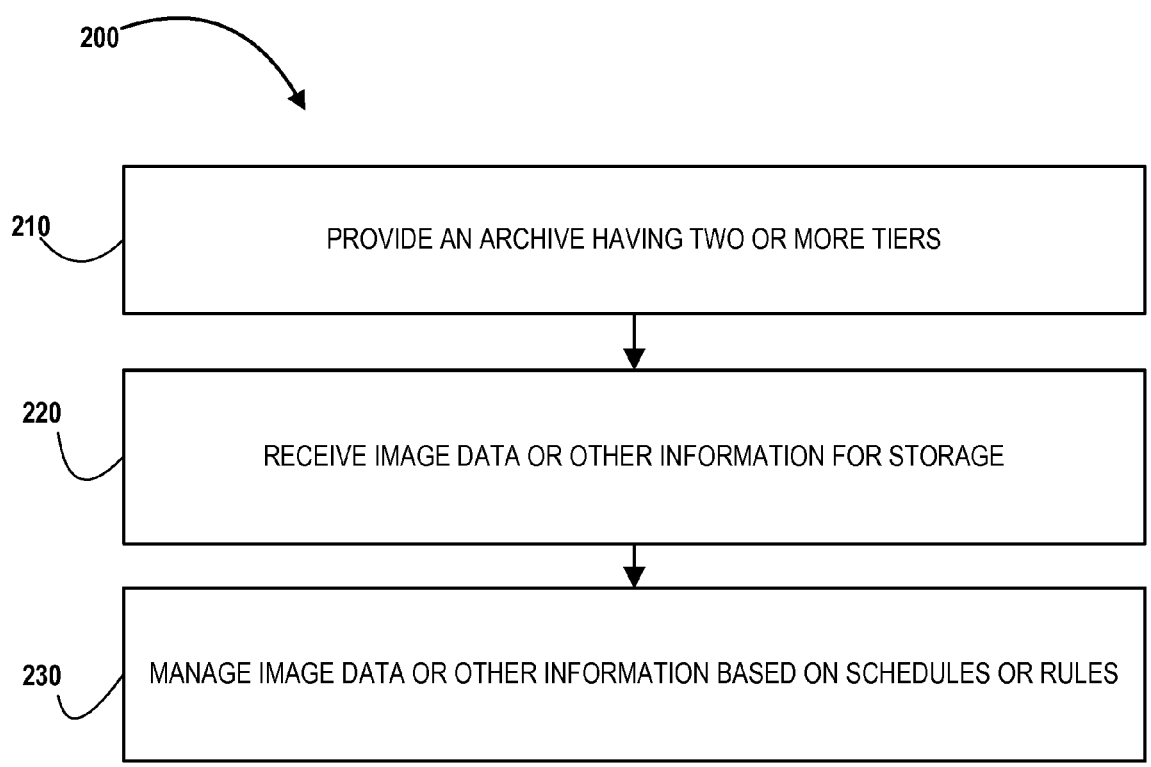

FIG. 2 illustrates a general process flow 200 is provided for the implementation of a tiered archive, in accordance with embodiments of the present invention.

Figure 3:
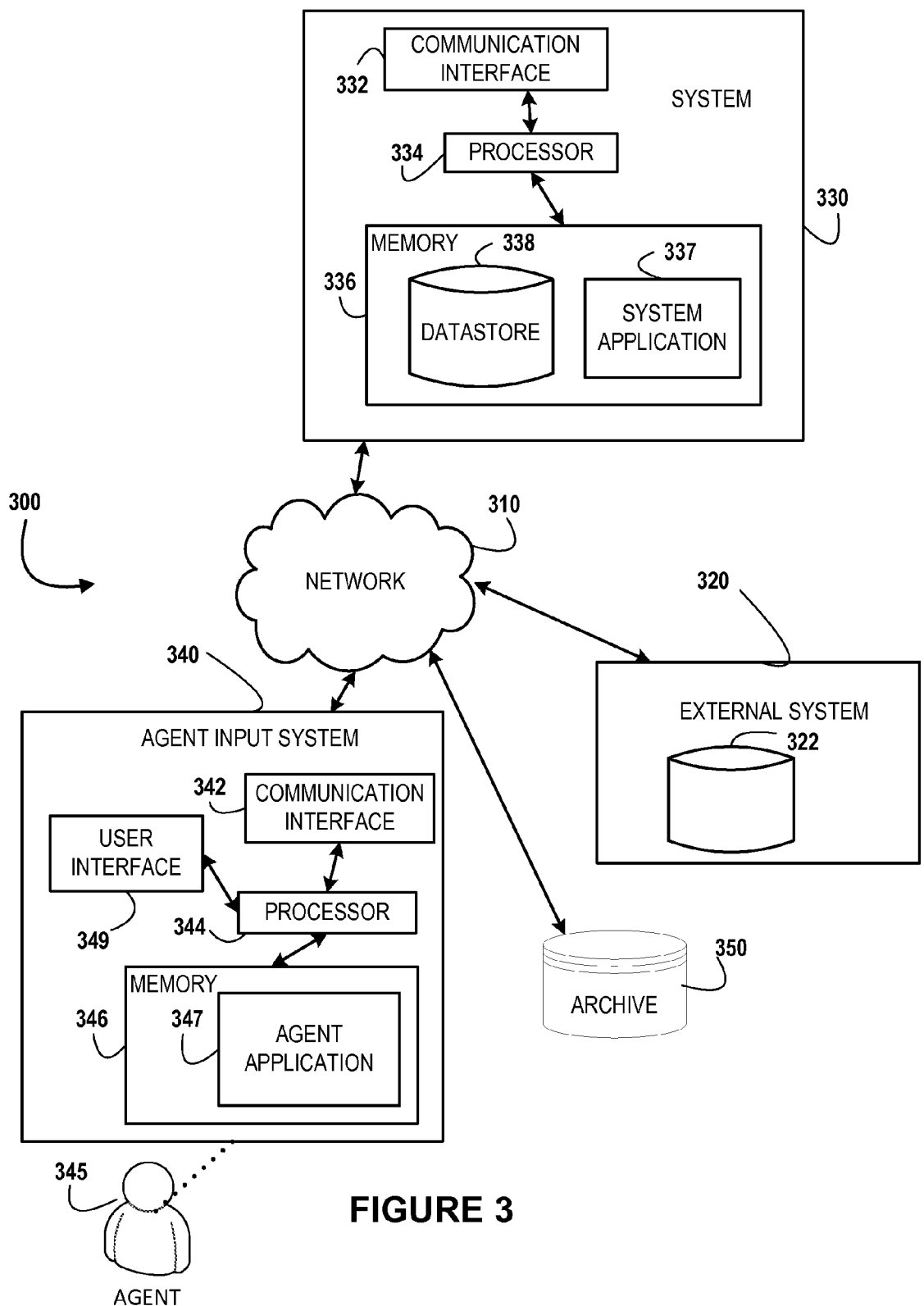

FIG. 3 illustrates an exemplary block diagram of the system environment 300 for implementing the process flows 100 and 200, described in FIGS. 1, and 2, in accordance with embodiments of the present invention.

DETAILED DESCRIPTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, and/or operational aspects of any of the embodiments described and/or contemplated herein may be included in any other embodiment of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout. Although the embodiments of the invention described herein are generally described as involving a "bank," one of ordinary skill in the art will appreciate that other embodiments of the invention may involve other financial institutions, or businesses outside of financial institutions, that utilize customer representatives, call centers, or other comparable systems.

Embodiments of the present invention relate to archive management technology with a purpose of saving storage space in the archive associated with an entity (e.g., a financial institution). Currently, an entity's check imaging system may receive an image of a check or other data at a high resolution (200 dots per inch (DPI)) and may store the image in the archive at this resolution for a mandated period of time, which may be years. In many instances, the mandated period of time is seven years for financial institutions. However, regulations may not require that the archived image be of this high resolution. To save storage space in the archive, the present invention may store check image data and other data in a stratified archive where the most recent check image data and other data are stored at a layer in the archive with a high resolution (or first dpi) and is moved to subsequent tiers within the archive according to schedules, rules, and/or a combination of schedules or rules. The check image data may be stored within the archive and periodically moved through the layers of the archive, in such a way that with each move through the archive the data storage footprint of the check image data and/or other data is reduced to thereby diminish the storage footprint of the check image and/or other data. It will be understood that a check is an example of a document that may be stored or processed in this invention. As used herein, a "check" may also refer to a myriad of financial documents including, but not limited to, a lease document, a mortgage document, a deposit slip, a payment coupon, a receipt, any negotiable instrument or the like. In some embodiments, the check may exist as a physical item printed on paper or other medium. In other embodiments, the check may exist electronically.

Referring now to FIG. 1, FIG. 1 is a general process flow 100 for establishing a tiered archive, in accordance with some embodiments of the invention. In some embodiments, as represented by block 110 the system executing process flow 100 establishes a tiered archive for long term storage of data in a stratified manner. As represented by block 120, the system executing process flow 100 assigns a data storage quality to each of the two or more layers of the archive. As represented by block 130, the system determines schedules and/or rules for managing the data in each of the two or more layers of the archive.

In block 110, the system establishes a tiered archive for storing data. In some embodiments, the system establishes a tiered archive by first determining or configuring two or more layers within an archive, where each layer within the archive is useable to store any type of data therein. In such an embodiment, each layer within the archive is configured to store data differently than the other layers within the archive. In some embodiments, each of the two or more layers within the archive is configured to store data in a certain type of file format. Thus, based on the configuring each layer within the archive results in having a specific and/or unique data structure. As an example, a file being stored in a first tier of an archive may only be stored in a jpeg file format because the first tier of the archive is configured to store data only in a jpeg file format, whereas the file if being stored in the second tier of the archive may only be stored in a pdf format because the second tier is configured to store data only in a pdf format. So, keeping with the example, the file may be stored in the first tier of the archive as a jpeg file for an amount of time and when transferred to the second tier of the archive, the file may be reformatted such that it is stored in a pdf file format because the second tier can only store files in a pdf file format. As a result, the data storage footprint of the file is reduced based on storing the file in a pdf with a lower image quality than a jpeg file. It will be understood that the term "tier" and "layer" are used interchangeably herein.

Still regarding block 110, each layer of an archive from the first layer to the Nth layer of the archive may be assigned successively smaller or larger data storage space. In some embodiments, the opposite is true where the last or Nth layer to the first layer of the archive is assigned successively smaller or larger data storage space. Thus, the system may also stratify the archive by creating layers within the archive having differing data storage spaces. As an example, in a tiered archive where files in a first tier are each stored in a first file format, the first tier may be assigned ten gigabytes (10 gigs) of data storage space. In such an example, files stored in the second tier are each stored in a second file format, where the second tier is assigned five gigabytes (5 gigs) of data storage space. Continuing with the example, when files originally stored in the first tier are moved to the second tier, said files are stored in the file format of the second tier, where the file format of the second tier reduces the data storage footprint of the file by approximately half or more. Thus, the system may assign lesser data storage space to the second tier because the file format assigned to the second tier stores files from the first tier in a data file size that is approximately half of the size that the file was saved in the first tier. As a quick example, a file stored in the first tier may be stored as a jpeg having a one megabyte (1 Mb) file size. But, when subsequently transfer to the second tier for storage, the file size is then reformatted to be stored in a pdf format which may result in a reduced file size of five hundred kilobytes (500 kb). It will be understood that this is just an example and many different data storage space sizes may be assigned to the tiers of an archive. Similarly, it will be understood, that when transferred and stored in a successive tier in an archive the reduction in size of a specific file does not necessarily have to be stored in half or approximately half of the original file size of the specific file when received from the previous tier. In fact, the reduction in file size may be any amount (e.g., 1%, 17%, 25%, 90%, or the like).

In block 120, the system executing process flow 100 assigns a data storage quality to each of the two or more layers within the archive. In some embodiments, each layer of the archive is assigned a different image quality requirement. In such an embodiment, each layer may be assigned data image quality ranging from low to high, which also includes various intermediate data image quality ranges. When a layer is assigned a low data image quality, the image of the files stored in that layer may have low image resolution (e.g., 50 dpi). When a layer is assigned a high data image quality, the image of the files stored in that layer of the archive may have high image resolution (e.g., 200 dpi). Although the assignment of low to high data image quality initially appears relative, it is not because each layer within the archive may be assigned data image quality in the range of low to high data image quality where each data image quality in the range of low to high data image quality is associated with a specific dots per inch (dpi) value, pixel value, or the like. For example, a low to high data image quality range for a tiered archive may be 25 dpi to 300 dpi, where if the archive has five tiers, each of the five tiers may be assigned a dpi value within the range of 25 dpi to 300 dpi. Further with the example, $1^{st}=275$ dpi, $2^{nd}=237$ dpi, $3^{rd}=98$ dpi, $4^{th}=50$ dpi, $5^{th}=26$ dpi. It will be understood that the measure of image quality may be any measure including, but not limited to, DPI, pixels, samples per inch, lines per inch, metric typography units, display resolution, mouse dpi, twip, and the like.

At block 130, the system executing process flow 100 determines schedules and/or rules for managing or maintaining the data stored in each of the two or more layers within an archive. In some embodiments, the system receives user input for generating one or more schedules for managing the data stored within each of the two or more layers within the archive. The user input may relate to legal requirements for maintaining certain type of financial data for specific periods of time, where the financial data may be associated with a financial institution, such as a bank. Or, the user input may relate to an efficient and/or optimized data storage schedule that maximizes the efficiency of the data storage capacity of the archive. The optimized data storage schedule may be based on a combination of a variety of factors including: the business need for the data stored in the archive, the legal requirements for storing the data, for storing the data, and/or the like. As an example, the system may determine a schedule for managing check images stored in a tiered archive based on legal requirements for storing check data, where the schedule dictates that check image data are to be stored in a first tier of the archive for three years from the initial storage date, then transferred to a second tier within the archive and stored there for two years, and then transferred again from the second tier to a third tier of the archive where the check image data is stored for an additional two years before it is purged from the archive. In each successive transfer of the check image data, the data footprint of the file was diminished by reducing the file size of the check image data in each of the second and third tiers of the archive.

Still regarding block 130, in some embodiments, the system executing process flow 100 determines one or more rules for managing the data stored in each of the two or more layers within the archive. In some embodiments, the system uses a combination of schedules and rules for managing the data within each of the two or more layers of the archive. The rules may be used to trigger the system to transfer data from a first tier to a second tier or even the reverse. In some embodiments, the rules for managing the data relate to instructions executable by the system for transferring data in the archives between one or more tiers and/or deleting or purging the data, for transferring the data from a tier to a queue for purging, for flagging information in the archives that require specific validation prior to being transferred to another tier within the archive, for providing a notification of information or status of data in the tiers of the archive, for extending or amending a schedule for the data in the tiers of the archive, and the like. As such, the one or more rules may relate to executable instructions for changing the status of some or all of the information stored in the archive. In some embodiments, the one or more rules are based on consumer preferences or input such that the maintenance and management of the information in the archives is partially governed by the preferences of the consumer, in the case of an event, or generally for any matter.

Referring now to FIG. 2, FIG. 2 is a general process flow 200 is provided for the implementation of a tiered archive, in accordance with embodiments of the present invention. As represented by block 210, a system executing process flow 200 provides a multi-tiered archive for the long-term storage of data. As represented by block 220, the system executing process flow 200 receives image data and other information for storage within the archive. As represented by block 230, the system executing process flow 200 manages the image data and other information stored in the archive based on schedules and/or one or more rules for managing data in each of the two or more tiers of the archive.

At block 210, a system executing process flow 200 provides an archive having two or more tiers for managing a long-term storage of data. The archive, in some embodiments, is maintained by a financial institution whereby the archive is used to store various financial documents including check images. In other embodiments, the archive may be maintained by a third party and another institution that is non-financial. In many instances, each of the two or more tiers of the archive is used to store information or data which may include text data and image data, such as check images and the like. Also, in some embodiments, each tier within the archive is associated with an image quality or image resolution. In such embodiments, the image quality associated with each tier of the archive is different such that as information is transferred from a first tier in the archive to a second tier in the archive or vice versa, the information that is transferred into the second tier is stored with the image quality assigned to the second tier. For example, information that is in a first tier of an archive associated with high image resolution (e.g., 200 dpi) may be moved to a second tier within the archive that is associated with lower image resolution (e.g., 100 dpi). In such an instance, while the image was within the first tier, it was stored at 200 dpi and after it is moved into the second tier of the archive the image resolution is reduced so that the image is subsequently stored at 100 dpi. As such, in this example, the transfer of the information from the first tier of the archive to the second tier of the archive effectively diminished the data footprint of the information by reducing the image resolution of the information. It will be understood that the archive may have one tier with various sub-tiers within the tier or the archive may have a plurality of tiers, including more than two tiers, where each tier of the plurality of tiers has a different image quality assigned to the tier. For example, an archive may have four tiers, including a $1^{st}$ tier, $2^{nd}$ tier, $3^{rd}$ tier, and $4^{th}$ tier, where the image quality assigned to each successive after the $1^{st}$ tier is reduced (e.g., $1^{st}$=200 dpi, $2^{nd}$=100 dpi, $3^{rd}$=50 dpi, and $4^{th}$=25 dpi or thumbnail).

In block 220, the system receives image data or other information and stores the image data and/or other information in a first image resolution within one of the two or more tiers of an archive. The image data or other information may be received for any source including internal sources of an entity maintaining the archive or a source external to an entity maintaining the archive. In some embodiments, the system stores the received image data and/or other information in a tier of archive associated with a particular image quality. For example, the system may receive check image data from one or more checks that it stores initially in the first tier at a high resolution, such as 200 dpi.

In block 230, the system manages data in the tiered archive based on schedules for maintaining the data and/or rules or a combination thereof. In many embodiments, the system manages the received image data or other information previously stored within the two or more tiers of the tiered archive. In such instances, the system may use the schedule to determine when a data file stored in a first tier should be moved to a second tier of the archive for storage. For example, a schedule for maintaining data in an archive having three tiers may dictate that a file be stored in a first tier of the archive for three years, then moved to a second tier of the archive and stored for an additional two years, and finally moved into a third tier of the archive and stored for a further additional two years prior to moving the file into a queue for being purge from the archive and/or system. It will be understood that the usage of first tier may indicate any tier within the archive having a high image quality than a subsequent tier or second tier of an archive, generally meaning that the data is moving across tiers in an archive. For example, first tier to second tier could mean third tier to fourth tier.

Referring now to FIG. 3, FIG. 3 presents an exemplary block diagram of the system environment 300 for implementing the process flows 100 and 200, described in FIGS. 1, and 2, in accordance with embodiments of the present invention. As illustrated, the system environment 300 includes a network 310, an external system 320, a system 330, an agent input system 340, and an archive 350. Also shown in FIG. 3 is an agent 345 of the agent input system 340. The agent 345 may be a person who uses the agent input system 340 to execute an agent application 347 or uses the agent input system 340 to initiate execution of a system application 337. The agent application 347 and/or the system application 337 may incorporate one or more parts of the process flows 100 and 200. The agent may be an employee of the entity that manages the system 330 and/or the external system 320. In other embodiments, the agent may not be an employee of an entity, but may still provide a service under the direction and/or supervision of the entity.

As shown in FIG. 3, the external system 320, the system 330, and the agent input system 340 are each operatively and selectively connected to the network 310, which may include one or more separate networks. In addition, the network 310 may include a local area network (LAN), a wide area network (WAN), and/or a global area network (GAN), such as the Internet. It will also be understood that the network 310 may be secure and/or unsecure and may also include wireless and/or wireline and/or optical interconnection technology.

The external system 320 may be any computing or non-computing system that transmits information to the system 330. Additionally or alternatively, information from the system 330 may be transmitted to the external system 320. As presented in FIG. 3, the external system 320 comprises at least one datastore 322. The datastore 322 may comprise information relating to at least one of a user, the user's financial institution account, user's information stored in the archives of the financial institution, and the like. As used herein, the terms "data" and "information" may be used interchangeably.

The agent input system 340 may include any computerized apparatus that can be configured to perform any one or more of the functions of the agent input system 340 described and/or contemplated herein. For example, the agent 345 may use the agent input system 340 to transmit and/or receive information or commands to and from the system 330. In some embodiments, for example, the agent input system 340 may include a personal computer system, a mobile computing device, a personal digital assistant, a network device, and/or the like. As illustrated in FIG. 3, in accordance with some embodiments of the present invention, the agent input system 340 includes a communication interface 342, a processor 344, a memory 346 having an agent application 347 stored therein, and an agent interface 349. In such embodiments, the communication interface 342 is operatively and selectively connected to the processor 344, which is operatively and selectively connected to the agent interface 349 and the memory 346. In some embodiments, the agent 345 may use the agent application 347 to execute processes described with respect to the process flows described herein, or may initiate the system 330 to execute the process flows described herein.

The archive 350 may include any computerized apparatus that can be configured to perform any one or more of the functions of the archive 350 described and/or contemplated herein. In addition, the archive 350 may include any physical structures and software elements to achieve the functions of the archive 350 described and/or contemplated herein.

Each communication interface described herein, including the communication interface 342, generally includes hardware, and, in some instances, software, that enables the agent input system 340, to transport, send, receive, and/or otherwise communicate information to and/or from the communication interface of one or more other systems on the network 310. For example, the communication interface 342 of the agent input system 340 may include a modem, server, electrical connection, and/or other electronic device that operatively connects the agent input system 340 to another system such as the system 330.

Each processor described herein, including the processor 344, generally includes circuitry for implementing the audio, visual, and/or logic functions of the agent input system 340. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the agent application 347 of the memory 346 of the agent input system 340.

Each memory device described herein, including the memory 346 for storing the agent application 347 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 3, the memory 346 includes the agent application 347. In some embodiments, the agent application 347 includes an interface for communicating with, navigating, controlling, configuring, and/or using at least one of the system 330 or the agent input system 340. In some embodiments, the agent application 347 includes computer-executable program code portions for instructing the processor 344 to perform one or more of the functions of the agent application 347 described and/or contemplated herein. In some embodiments, the agent application 347 may include and/or use one or more network and/or system communication protocols.

Also shown in FIG. 3 is the user interface 349. In some embodiments, the user interface 349 includes one or more output devices, such as a display and/or speaker, for presenting information to the agent 345. In some embodiments, the user interface 349 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the agent 345. In some embodiments, the user interface 349 includes the input and display devices of a personal computer, such as a keyboard and monitor, which are operable to receive and display information.

FIG. 3 also illustrates a system 330, in accordance with an embodiment of the present invention. The system 330 may include any computerized apparatus that can be configured to perform any one or more of the functions of the system 330 described and/or contemplated herein. In accordance with some embodiments, for example, the system 330 may include a computer network, an engine, a platform, a server, a database system, a front end system, a back end system, a personal computer system, and/or the like. In some embodiments, such as the one illustrated in FIG. 3, the system 330 includes a communication interface 332, a processor 334, and a memory 336, which includes a system application 337 and a datastore 338 stored therein. As shown, the communication interface 332 is operatively and selectively connected to the processor 334, which is operatively and selectively connected to the memory 336.

It will be understood that the system application 337 may be configured to implement any one or more portions of the various user interfaces and/or process flows described herein. It will also be understood that, in some embodiments, the memory includes other applications. It will also be understood that, in some embodiments, the system application 337 is configured to communicate with the datastore 338, the agent input system 340 and/or the external system 320.

It will be further understood that, in some embodiments, the system application 337 includes computer-executable program code portions for instructing the processor 334 to perform any one or more of the functions of the system application 337 described and/or contemplated herein. In some embodiments, the system application 337 may include and/or use one or more network and/or system communication protocols.

In addition to the system application 337, the memory 336 also includes the datastore 338. As used herein, the datastore 338 may be one or more distinct and/or remote datastores. In some embodiments, the datastore 338 is not located within the system and is instead located remotely from the system. In some embodiments, the datastore 338 stores information or data described herein. For example, the datastore 338 may store information relating to at least one of the user, schedules for managing data in the archive, rules related to the maintenance and management of the information in the archive, and the like.

It will be understood that the datastore 338 may include any one or more storage devices, including, but not limited to, archives, datastores, databases, and/or any of the other storage devices typically associated with a computer system. It will also be understood that the datastore 338 may store information in any known way, such as, for example, by using one or more computer codes and/or languages, alphanumeric character strings, data sets, figures, tables, charts, links, documents, and/or the like. Further, in some embodiments, the datastore 338 may include information associated with one or more applications, such as, for example, the system application 337. It will also be understood that, in some embodiments, the datastore 338 provides a substantially real-time representation of the information stored therein, so that, for example, when the processor 334 accesses the datastore 338, the information stored therein is current or substantially current.

It will be understood that the embodiment of the system environment illustrated in FIG. 3 is exemplary and that other embodiments may vary. As another example, in some embodiments, the system 330 includes more, less, or different components. As another example, in some embodiments, some or all of the portions of the system environment 300 may be combined into a single portion. Likewise, in some embodiments, some or all of the portions of the system 330 may be separated into two or more distinct portions.

In addition, the various portions of the system environment 300 may be maintained for and/or by the same or separate parties. For example, the system 330 and the external system 320 may be maintained by separate parties.

It will also be understood that the system 330 may include and/or implement any embodiment of the present invention described and/or contemplated herein. For example, in some embodiments, the system 330 is configured to implement any one or more of the embodiments of the process flow 100 and 200 described and/or contemplated herein in connection with FIGS. 1 and 2 or any other process flow described herein.

In some embodiments, one or more of the portions of the process flows represented by blocks 110-130 and 210-230 are triggered by one or more triggering events, which, in some embodiments, include the performance of one or more of the other portions of the process flow represented by blocks 110-130 and 210-230. Also, in some embodiments, the system executing process flows 100 and 200 are configured to perform one or more portions (or combinations of portions) of the process flows represented by blocks 110-130 and 210-230, from start to finish, within moments, seconds, and/or minutes.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

What is claimed:

1. A system for managing an archive having multiple tiers, the system comprising:
    an archive having two or more tiers for storing data, where each of the two or more tiers is assigned an image quality value, and wherein the image quality value assigned to each of the two or more tiers of the archive represents two or more tiers quantifiably different in image resolution between the two or more tiers measured by pixel values, and wherein each of the two or more tiers have data stored therein;
    a processing device in communication with the archive, wherein the processing device is configured to:
        create two or more tiers within the archive to store data according to a data structure sorted by image quality, file format, and file age, wherein each of the two or more tiers may contain various sub-tiers, wherein each sub-tier has an image quality assigned to it within the image resolution of the tier;
        receive data to be stored within the archive, wherein the received data comprises images or other files that may be sorted according to image quality, file format, and file age;
        store the data in one of the two or more tiers based on a set of rules associated with image quality, file format, and file age;
        store data in a first of the two or more tiers of the archive based at least partially on the image quality value assigned to the first of the two or more tiers of the archive;
        store data in a second of the two or more tiers of the archive based at least partially on the schedule and the image quality value assigned to the second of the two or more tiers of the archive;
        stratify and reassign storage space in the two or more tiers to optimize storage use, whereby optimizing storage use includes reassigning available storage space to each of the two or more tiers to account for changes in image quality, file format, and file location.

2. The system of claim 1, wherein each of the two or more tiers is assigned a file format for storing data, and wherein the file format assigned to each of the two or more tiers of the archive is different;
    wherein the storing data in the first of the two or more tiers of the archive is further based at least partially on the file format assigned to the first of the two or more tiers of the archive; and
    wherein the storing data in the second of the two or more tiers of the archive is further based at least partially on the file format assigned to the second of the two or more tiers of the archive.

3. The system of claim 1, wherein the processing device is further configured to:
    periodically transfer data having the image quality of the first tier of the archive and stored in the first to the second tier of the archive based on the schedule or the one or more rules, wherein the data is then stored in the second tier of the archive based at least partially on the image quality assigned to the second tier of the archive.

4. The system of claim 1, wherein the one or more rules relate to instructions for managing the archive by, at least, transferring data stored in the archive between the two or more tiers in the archive.

5. The system of claim 1, wherein the schedule for managing the data stored in the two or more tiers based at least partially on legal requirements for storing financial data at a financial institution.

6. The system of claim 1, wherein the image quality value assigned to each of the two or more tiers in the archive is based on a range of dots per inch (dpi) values or pixel values.

7. A computer-implemented method for managing an archive having multiple tiers for storing data, the computer-implemented method comprising:
    providing an archive having two or more tiers for storing data, where each of the two or more tiers is assigned an image quality value, and wherein the image quality value assigned to each of the two or more tiers of the archive is different represents two or more tiers quantifiably different in image resolution between the two or more tiers measured by pixel values, and wherein each of the two or more tiers have data stored therein;
    providing a computer processor executing non-transitory computer-readable instruction code specifically structured to cause the computer processor to:
        create two or more tiers within the archive to store data according to a data structure sorted by image quality, file format, and file age, wherein each of the two or more tiers may contain various sub-tiers, wherein each sub-tier has an image quality assigned to it within the image resolution of the tier;
    receive data to be stored within the archive, wherein the received data comprises images or other files that may be sorted according to image quality, file format, and file age;
        store the data in one of the two or more tiers based on a set of rules associated with image quality, file format, and file age;
        store data in a first of the two or more tiers of the archive based at least partially on the image quality value assigned to the first of the two or more tiers of the archive;

store data in a second of the two or more tiers of the archive based at least partially on the schedule and the image quality value assigned to the second of the two or more tiers of the archive;

stratify and reassign storage space in the two or more tiers to optimize storage use, whereby optimizing storage use includes reassigning available storage space to each of the two or more tiers to account for changes in image quality, file format, and file location.

8. The computer-implemented method of claim 7, wherein each of the two or more tiers is assigned a file format for storing data, and wherein the file format assigned to each of the two or more tiers of the archive is different;

wherein the storing data in the first of the two or more tiers of the archive is further based at least partially on the file format assigned to the first of the two or more tiers of the archive; and wherein the storing data in the second of the two or more tiers of the archive is further based at least partially on the file format assigned to the second of the two or more tiers of the archive.

9. The computer-implemented method of claim 7, wherein the computer processor is further executing computer-readable instruction code specifically configured to cause the computer processor to:

periodically transfer data having the image quality of the first tier of the archive and stored in the first to the second tier of the archive based on the schedule or the one or more rules, wherein the data is then stored in the second tier of the archive based at least partially on the image quality assigned to the second tier of the archive.

10. The computer-implemented method of claim 7, wherein the one or more rules relate to instructions for managing the archive by, at least, transferring data stored in the archive between the two or more tiers in the archive.

11. The computer-implemented method of claim 7, wherein the schedule for managing the data stored in the two or more tiers based at least partially on legal requirements for storing financial data at a financial institution.

12. The computer-implemented method of claim 7, wherein the image quality value assigned to each of the two or more tiers in the archive is based on a range of dots per inch (dpi) values or pixel values.

13. A computer program product for managing an archive having multiple tiers configured for storing data, the computer program product comprising a non-transitory computer-readable medium, wherein the non-transitory computer-readable medium comprises one or more computer-executable program code portions that, when executed by a computer, cause the computer to:

create two or more tiers within the archive to store data according to a data structure sorted by image quality, file format, and file age, wherein each of the two or more tiers may contain various sub-tiers, wherein each sub-tier has an image quality assigned to it within the image resolution of the tier;

receive data to be stored within the archive, wherein the received data comprises images or other files that may be sorted according to image quality, file format, and file age;

store the data in one of the two or more tiers based on a set of rules associated with image quality, file format, and file age;

store data in a first of the two or more tiers of the archive based at least partially on the image quality value assigned to the first of the two or more tiers of the archive;

store data in a second of the two or more tiers of the archive based at least partially on the schedule and the image quality value assigned to the second of the two or more tiers of the archive;

stratify and reassign storage space in the two or more tiers to optimize storage use, whereby optimizing storage use includes reassigning available storage space to each of the two or more tiers to account for changes in image quality, file format, and file location.

14. The computer program product of claim 13, wherein each of the two or more tiers is assigned a file format for storing data, and wherein the file format assigned to each of the two or more tiers of the archive is different;

wherein the storing data in the first of the two or more tiers of the archive is further based at least partially on the file format assigned to the first of the two or more tiers of the archive; and wherein the storing data in the second of the two or more tiers of the archive is further based at least partially on the file format assigned to the second of the two or more tiers of the archive.

15. The computer program product of claim 13, wherein the one or more computer-executable program code portions, when executed by the computer, cause the computer to: periodically transfer data having the image quality of the first tier of the archive and stored in the first to the second tier of the archive based on the schedule or the one or more rules, wherein the data is then stored in the second tier of the archive based at least partially on the image quality assigned to the second tier of the archive.

16. The computer program product of claim 13, wherein the one or more rules relate to instructions for managing the archive by, at least, transferring data stored in the archive between the two or more tiers in the archive.

17. The computer program product of claim 13, wherein the schedule for managing the data stored in the two or more tiers based at least partially on legal requirements for storing financial data at a financial institution.

\* \* \* \* \*